United States Patent
Nakatani et al.

(10) Patent No.: US 12,413,095 B2
(45) Date of Patent: Sep. 9, 2025

(54) POWER STORAGE SYSTEM

(71) Applicant: TOYOTA JIDOSHA KABUSHIKI KAISHA, Toyota (JP)

(72) Inventors: Hiroyuki Nakatani, Gotenba (JP); Masahiro Takahashi, Nagakute (JP); Kazutaka Kimura, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/987,852

(22) Filed: Dec. 19, 2024

(65) Prior Publication Data

US 2025/0260261 A1 Aug. 14, 2025

(30) Foreign Application Priority Data

Feb. 14, 2024 (JP) ................. 2024-020401

(51) Int. Cl.
*H02J 15/00* (2006.01)
*H02J 7/00* (2006.01)
*H02J 7/34* (2006.01)

(52) U.S. Cl.
CPC .............. *H02J 15/008* (2020.01); *H02J 7/34* (2013.01); *H02J 7/0063* (2013.01); *H02J 2310/42* (2020.01)

(58) Field of Classification Search
CPC .......... H02J 15/008; H02J 7/34; H02J 7/0063; H02J 2310/42
See application file for complete search history.

(56) References Cited

U.S. PATENT DOCUMENTS 12,195,142 B2 * 1/2025 Sheldon-Coulson ........................ F03B 13/142
2023/0341180 A1 * 10/2023 Huang .................... F25J 1/0236

FOREIGN PATENT DOCUMENTS

| JP | 2005280581 A | * | 10/2005 |
| JP | 4513127 B2 | * | 7/2010 |
| JP | 6437191 B2 | * | 12/2018 |
| JP | 2021-158809 A | | 10/2021 |
| JP | 2023-001490 A | | 1/2023 |
| WO | WO-2024237124 A1 | * | 11/2024 |

OTHER PUBLICATIONS

Translation JP-2005280581-A (Year: 2025).*
Translation JP-4513127-B2 (Year: 2025).*
Translation JP-6437191-B2 (Year: 2025).*
Translation WO-2024237124-A1 (Year: 2025).*

* cited by examiner

*Primary Examiner* — J. Todd Newton
(74) *Attorney, Agent, or Firm* — Oliff PLC

(57) ABSTRACT

The power storage system includes a main storage system configured to be capable of navigating a water surface and configured to generate electric power using renewable energy, wherein the electric power obtained by the electric power generation is irreversibly stored in the electric power generation floating body, and a sub-storage system in which the electric power obtained by the electric power generation is reversibly stored in the electric power generation floating body.

4 Claims, 3 Drawing Sheets

POWER STORAGE SYSTEM

CROSS-REFERENCE TO RELATED APPLICATION

This application claims priority to Japanese Patent Application No. 2024-020401 filed on Feb. 14, 2024, incorporated herein by reference in its entirety.

BACKGROUND

1. Field

The disclosure relates to a power storage system that stores power obtained by power generation using renewable energy.

2. Description of Related Art

As a power storage system for storing power obtained by power generation using renewable energy, a system is known in which an excess amount of power obtained by photovoltaic power generation is charged in a storage battery and recovered (e.g., see Japanese Unexamined Patent Application Publication No. 2023-001490 (JP 2023-001490 A)). Besides power from a system power source, there is also known a power supply system in which power from photovoltaic power generation and power from fuel cells are provided as appropriate (e.g., see Japanese Unexamined Patent Application Publication No. 2021-158809 (JP 2021-158809 A)). In this power supply system, power generated by photovoltaic power generation and power generated by fuel cells are used to charge a common storage battery.

SUMMARY

However, the storage battery has a disadvantage of self-discharge when storing for prolonged periods of time. Accordingly, depending on usage of the generated power, there are various technical problems such as the storage battery alone not being able to perform efficient energy utilization, and so forth.

An object of the disclosure is to provide a power storage system that enables efficient energy utilization in accordance with the usage of electricity generated by renewable energy.

A power storage system according to an aspect of the disclosure is provided in a power generation floating body that is configured to navigate a water surface and that performs power generation using renewable energy.

The power storage system includes a main storage system in which power obtained by the power generation is irreversibly stored with respect to the power generation floating body, and a sub-storage system in which power obtained by the power generation is stored reversibly with respect to the power generation floating body.

The power storage system according to an aspect of the disclosure includes two storage systems, which are the main storage system and the sub-storage system, in accordance with the usage of electricity generated by renewable energy. This enables efficient energy utilization.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
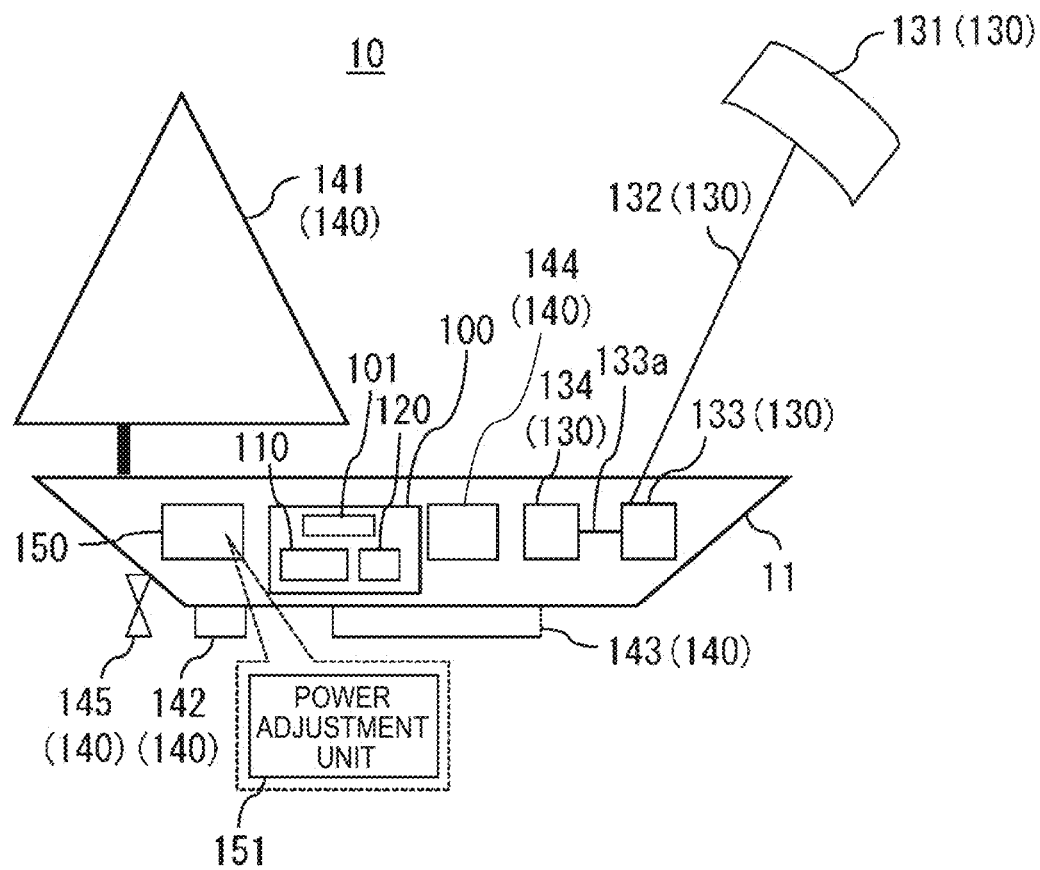
FIG. 1 is a schematic configuration diagram illustrating an example of a power generation floating body.

The power storage system according to the present disclosure is configured to be able to navigate the water surface, and is provided in a power generation floating body that performs power generation using renewable energy. In the present embodiment, as an example, a case where the power generation floating body 10 shown in FIG. 1 is provided with the power storage system according to the present disclosure will be described. Configuration of the power generation floating body 10

First, the power generation floating body 10 according to the present embodiment will be described. The power generation floating body 10 may be, for example, a sailing ship type floating body capable of navigating a river, a lake, a sea, or the like. In the present embodiment, the power generation floating body 10 is described as a sailing ship type floating body that travels in the sea. The power generation floating body 10 includes, for example, a hull 11 floating on the water surface, and may further include, for example, a storage unit 100, a power generation unit 130, a navigation unit 140, and a control unit 150. The power generation floating body 10 may further include a communication unit (not shown) that enables wireless communication with the outside.

The power generation unit 130 may include a plurality of elements utilized for wind power generation. The power generation unit 130 may be configured to generate wind power using, for example, a kite 131 connected to the hull 11 via the tether 132. The power generation unit 130 may include a tether 132 and a kite 131, as well as a winch 133 and a generator 134, as shown in FIG. 1. The winch 133 has a rotating shaft body 133a as a rotating shaft, and the rotating shaft body 133a is connected to a rotating shaft of the generator 134. A tether 132 is wound around the rotating shaft body 133a. When the kite 131 is raised, the tether 132 is unwound from the winch 133 as the kite is raised. The rotating shaft body 133a is rotated by the feeding-out operation of the tether 132. The rotation shaft of the generator 134 rotates in conjunction with the rotation when the kite 131 moves upward, thereby generating electric power. Further, when the rotating shaft body 133a rotates in the winding direction of the tether 132, the tether 132 is collected and the kite 131 is lowered. When the tether 132 is collected, the generator 134 may rotate the rotating shaft body 133a based on a command from the control unit 150.

The navigation unit 140 may include a plurality of elements for causing the power generation floating body 10 to navigate over the sea. The navigation unit 140 may be configured to be capable of navigating (i.e., sailing) the sea using, for example, wind energy received in the sail 141 as a power source. The navigation unit 140 may be provided with, for example, a sail 141, a ladder 142 for determining the direction of the hull 11, and a center board 143 for generating a lateral force. In addition to the movement by wind power, the power generation floating body 10 may include, for example, a propeller 145 and a motor 144 as a power source as the navigation unit 140 so as to be able to move by electric power. For example, electric power generated by the power generation unit 130 may be used to drive the motor 144. Further, the navigation unit 140 may include sensors necessary for maritime navigation. The sensors may include, for example, a wind direction wind speed sensor, a wind volume sensor, an acceleration sensor, an angular velocity sensor, a velocity sensor, and the like.

The control unit 150 controls various processes in the power generation floating body 10. The control unit 150 may be configured as a control unit including, for example, a CPU (Central Processing Unit) and a storage device and an input/output interface required for the operation of CPU. The storage device may include, for example, ROM (Read Only Memory), RAM (Random Access Memory), and data storage. The control unit 150 may be connected to each unit 100, 130, 140 by a data bus, for example, via an input/output interface. The control unit 150 may, for example, send control instructions to each unit 100, 130, 140 via a data bus. The control unit 150 may obtain various types of information from the respective units 100, 130, and 140 via a data bus, for example.

ROM may store, for example, a computer program for implementing a process in the control unit 150. The control unit 150 may read a computer program stored in a ROM or data storage. Alternatively, the control unit 150 may acquire (i.e., download) a computer program from a device (not shown) disposed outside the power generation floating body 10 via a communication unit (not shown), and read the acquired computer program. The control unit 150 executes the read computer program. As a result, a logical functional block for controlling the operation of the power generation floating body 10 is realized in the control unit 150. FIG. 1 shows an example of logical functional blocks implemented in the control unit 150. In the example illustrated in FIG. 1, the power adjustment unit 151 is implemented in the control unit 150. Details of the operation of the power adjustment unit 151 will be described later.

Storage Unit Configuration

The storage unit 100 is a unit configured to store electric power generated by the power generation unit 130. The storage unit 100 of the present embodiment may include, for example, a power distribution device 101, a main storage system 110, and a sub-storage system 120. Each element of the storage unit 100 will be described with reference to FIG. 2.

The power distribution device 101 distributes the electric power generated by the power generation unit 130 to each of the main storage system 110 and the sub-storage system 120, and outputs the electric power. The power distribution device 101 may be configured such that, for example, the input power is distributed and output by a known method in accordance with a control instruction from the power adjustment unit 151, which will be described later.

The main storage system 110 is a system configured to store electric power generated by the power generation unit 130 so as to be transported from the power generation floating body 10 to the outside (for example, a demand site). The sub-storage system 120 is a system configured to store electric power generated by the power generation unit 130 for use in the power generation floating body 10. The electric power used in the power generation floating body 10 may be, for example, electric power necessary for the operation of the self-power generation system. Details of the operation of the self-fund will be described later. The main storage system 110 may employ a power storage method in which an apparatus for storing electric power is larger and processing steps are larger than that of the sub-storage system 120.

Configurations of the main storage system 110 and the sub-storage system 120 will be described.

Configuring the Main Storage System

The main storage system 110 will be described. The main storage system 110 is configured to store power in a manner suitable for long-distance mass transportation. As a method of storing electric power in the main storage system 110, for example, a method having a high energy density may be employed. For example, a $CO_2$ free hydrogen carrier (including hydrogen itself and a hydrogen compound) may be employed as a way of storing power in the main storage system 110. The hydrogen carrier employed in the main storage system 110 may be, for example, any of compressed hydrogen, liquefied hydrogen, a hydrogen storage alloy, ammonia, methylcyclohexane, and the like. In the present embodiment, a case where a hydrogen storage alloy is employed as a method for storing electric power will be described.

Figure 2:
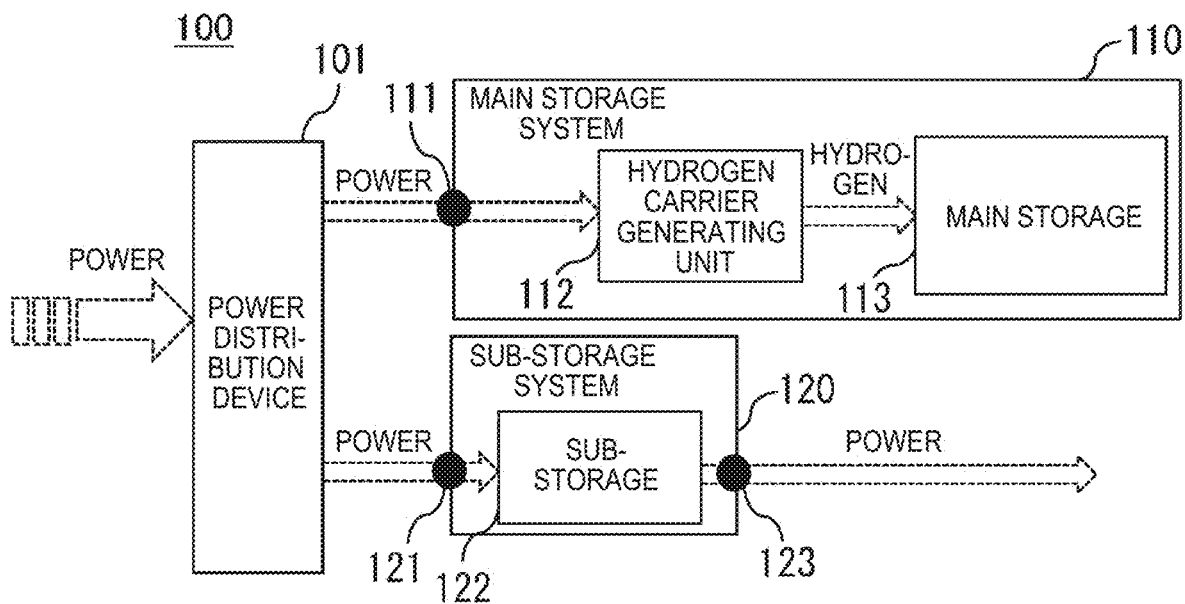
FIG. 2 is a schematic configuration diagram of the storage unit shown in FIG. 1.

As illustrated in FIG. 2, the main storage system 110 of the present embodiment may include, for example, a main power input unit 111, a hydrogen carrier generating unit 112, and a main storage 113. The main power input unit 111 functions as an interface of the main storage system 110 with respect to the power generated by the power generation unit 130. That is, the electric power generated by the power generation unit 130 is input to the main storage system 110 via the main power input unit 111.

The hydrogen carrier generating unit 112 may include, for example, a water separator and a water electrolysis system. The water separator may be, for example, a device for separating water from seawater or the like. If water is separately available, the water separator may be omitted. The water electrolysis system may be configured such that, for example, the water separated by the water separator is electrolyzed by the generated electric power to generate hydrogen.

The hydrogen carrier generating unit 112 may include various devices necessary for generating the hydrogen carrier according to the hydrogen carrier employed. For example, when the hydrogen carrier is compressed hydrogen, a compression device for compressing hydrogen or the like may be included in the hydrogen carrier generating unit 112. For example, when the hydrogen carrier is liquefied hydrogen, a compression device that compresses hydrogen, a liquefaction device that liquefies compressed hydrogen, and the like may be included in the hydrogen carrier generating unit 112. For example, when the hydrogen carrier is methylcyclohexane, a reactor for hydrogenating toluene, a reactor for maintaining a reaction environment for maintaining a reaction temperature and a reaction pressure, and the like may be included in the hydrogen carrier generating unit 112. For example, when the hydrogen carrier is ammonia, the hydrogen carrier generating unit 112 may include an air separation device for obtaining nitrogen in the air, a reaction device for reacting nitrogen with hydrogen, a reaction environment maintenance device for maintaining the reaction temperature and the reaction pressure, and the like. The main storage system 110 may include various devices necessary for storing the hydrogen carrier, depending on the hydrogen carrier employed. For example, when the hydrogen carrier is liquefied hydrogen, a cooling device for cooling the main storage 113 in which the liquefied hydrogen is stored may be included in the main storage 113.

The main storage 113 may comprise, for example, at least one hydrogen storage alloy tank. In the main storage 113, hydrogen generated by the hydrogen carrier generating unit 112 is stored in a hydrogen storage alloy tank. The main storage system 110 may include a power storage sensor (not shown) that detects an amount of electric power (that is, an amount of electric power stored) stored in the main storage 113.

The main storage system 110 has a main power input to which power is input, but does not have an output to which power or hydrogen is output. As described above, the main storage system 110 is configured such that the electric power generated by the power generation unit 130 is irreversibly stored in the main storage 113 with respect to the power generation floating body 10. That is, the electric power generated by the main storage 113 and the power generation unit 130 is a storage that is irreversibly stored in the power generation floating body 10.

Configuring Sub-Storage System

Next, the sub-storage system 120 will be described. As described above, the sub-storage system 120 is configured to store power necessary for the operation of its own base. The electric power required for the operation of the own base may include electric power required for the operation of each of the units 100, 130, 140, and 150. The operation of the storage unit 100 may include, for example, the operation of the main storage system 110 (the operation of the hydrogen carrier generating unit 112, the operation of the main storage 113, and the like). The operation of the storage unit 100 may also include, for example, the operation of the sub-storage system 120. The operation of the power generation unit 130 may include, for example, the operation of the winch 133 and the operation of the kite 131. Operation of the navigation unit 140 may include, for example, operation of the sail 141, operation of the ladder 142, operation of the motor 144, operation of the propeller 145, and the like. The operation of the control unit 150 may include, for example, loading and unloading of information with a storage device, various operations for controlling operations of the respective units 100, 130, and 140, and transmission and reception of information (including control instructions) with the respective units 100, 130, and 140.

As illustrated in FIG. 2, the sub-storage system 120 of the present embodiment may include, for example, a sub-power input unit 121, a sub-storage 122, and a sub-power output unit 123. The sub-power input unit 121 functions as an interface of the sub-storage system 120 with respect to the power generated by the power generation unit 130. That is, the electric power generated by the power generation unit 130 is input to the sub-storage system 120 via the sub-power input unit 121.

The sub storage 122 stores the power input via the sub power input unit 121. The sub-storage 122 may employ a power storage method in which the stored power is stored immediately (or simply) in an available manner. As the sub storage 122, for example, a storage battery that can be repeatedly charged and discharged may be employed. The sub-storage system 120 may include a power storage sensor (not shown) that detects an amount of electric power (that is, an amount of electric power stored) stored in the sub-storage 122. In addition, since the amount of electric power necessary for the operation of the own base needs to be secured in the sub storage 122, the allowable amount of electric power storage in the sub-storage system 120 may be considerably smaller than the allowable amount of electric power storage in the main storage system 110 in which electric power is stored for transportation. That is, the allowable storage amount of the main storage system 110 may be considerably larger than the allowable storage amount of the sub-storage system 120.

The sub-power output unit 123 is an output unit that outputs the electric power stored in the sub-storage system 120 to each element of the power generation floating body 10. That is, the electric power stored in the sub-storage system 120 is output to each element of the power generation floating body 10 via the sub-power output unit 123. The sub-storage system 120 may be configured to output power in response to a control instruction from the control unit 150, for example.

The sub-storage system 120 includes a sub-power input to which power is input, and a sub-power output to which power is output. As described above, the sub-storage system 120 is configured such that the electric power generated by the power generation unit 130 is reversibly stored in the sub-storage 122 with respect to the power generation floating body 10. That is, the sub storage 122 is a storage in which electric power generated by the power generation unit 130 is reversibly stored in the power generation floating body 10.

Electric Power Flow in a Generation Floating Body

Figure 3:
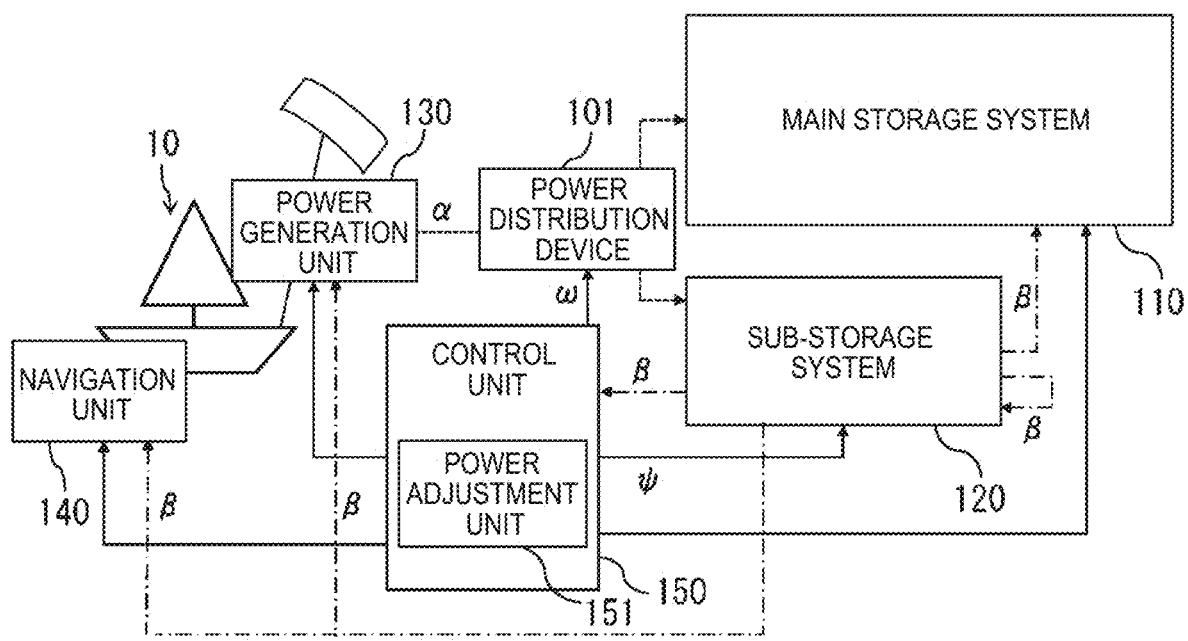
FIG. 3 is an explanatory view showing an exemplary flow of electric power in a power generation floating body.

Here, a flow of electric power generated by the power generation unit 130 will be described with reference to FIG. 3. The electric power $\alpha$ generated by the power generation unit 130 is distributed between the main storage system 110 and the sub-storage system 120 by the power distribution device 101. The power $\alpha$ may be adjusted, for example, by a control instruction $\omega$ from the power adjustment unit 151 of the control unit 150 to the power distribution device 101. The processing performed by the power adjustment unit 151 will be described later. The sub-storage system 120 may output the stored power, for example, in response to a control instruction $\psi$ from the control unit 150. The control instruction W may indicate, for example, an output destination and an output amount of power. The electric power $\beta$ output from the sub-storage system 120 in response to the control instruction $\psi$ may be output to the respective elements of the respective units 100, 130, 140, and 150 of the power generation floating body 10 based on the control instruction W. The power $\beta$ may be output to each element of the storage unit 100, each element of the power generation unit 130, each element of the navigation unit 140, or each element of the control unit 150, for example, in response to the control instruction v.

Allocation Adjustment Process

Figure 4:
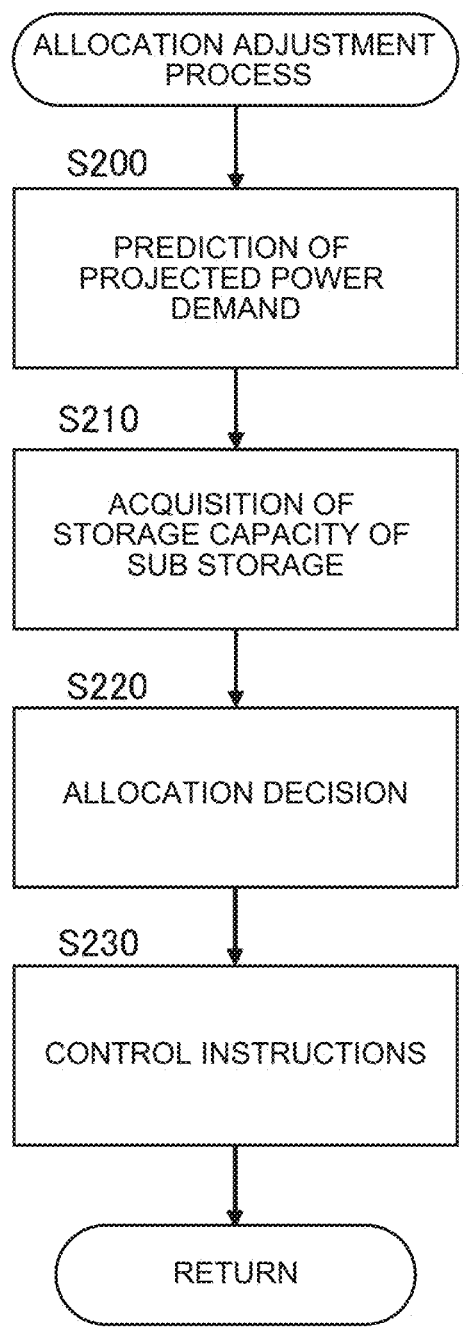
FIG. 4 is a flowchart illustrating an example of a flow of distribution adjustment processing.

As described above, the electric power $\alpha$ generated by the power generation unit 130 is distributed between the main storage system 110 and the sub-storage system 120. The power adjustment unit 151 may perform, for example, allocation adjustment processing in order to adjust the allocation between the main storage system 110 and the sub-storage system 120 (hereinafter, referred to as "storage allocation"). FIG. 4 is an example of a distribution adjustment process. The allocation adjustment process may be repeated, for example. The allocation adjustment process may be performed by a predetermined trigger, for example.

In the distribution adjustment process, first, the power adjustment unit 151 may predict an projected power demand in the power generation floating body 10 (S200). The projected power demand amount may be, for example, an amount of electric power necessary for the operation of the power generation floating body 10. The power adjustment unit 151 may predict, as the projected power demand amount, the projected power demand amount of each of the units 100, 130, 140, and 150, for example. The power adjustment unit 151 may predict a projected power demand amount based on various types of information. The various types of information may include, for example, various types of sensor information obtained from various types of sensors provided in the power generation floating body 10. The various types of information may include sea condition information and wind condition information obtained from a predetermined provider via a communication unit (not shown). Next, the power adjustment unit 151 may acquire the power storage capacity of the sub-storage 122 (S210). For example, the power adjustment unit 151 may acquire power storage information obtained from a power storage sensor (not shown) of the sub-storage system 120. The power storage information may include a power storage amount and/or a power storage rate. The power adjustment unit 151 may consider, for example, the energy loss until the electric power stored in the sub storage 122 is supplied to the power demand destination as the electric storage amount of the sub storage 122.

Subsequently, the power adjustment unit 151 may perform a distribution determination process (S220). In the allocation determination process, the power adjustment unit 151 may determine the storage allocation based on the projected power demand amount that is predicted, for example. For example, the power adjustment unit 151 may determine the storage allocation such that the storage amount of the sub storage 122 secures a projected power demand amount. The power adjustment unit 151 may determine, for example, a difference between the amount of power stored in the sub-storage 122 and the projected power demand amount as the amount of power to be supplied to the sub-storage system 120. The power adjustment unit 151 may determine the storage allocation such that, for example, power exceeding the amount of power to be supplied to the sub-storage system 120 is supplied to the main storage system 110. For example, when the storage amount of the sub storage 122 exceeds the projected power demand amount, the power adjustment unit 151 may determine the storage allocation to the sub-storage system 120 to be zero.

After the allocation determination process, the power adjustment unit 151 may proceed to the control instruction process (S250). In the control instruction processing, the power adjustment unit 151 may transmit the control instruction ω so that the power α is allocated by the storage allocation determined by the allocation determination processing, for example.

The power storage system according to the present disclosure is realized by the storage unit 100 and the power adjustment unit 151.

Other Forms

In the sub-storage system 120, compressed hydrogen may be employed as a method of storing power. When a hydrogen carrier is also adopted in the main storage system 110, the hydrogen carrier generating unit 112 may be shared between the sub-storage system 120 and the main storage system 110. The sub-storage 122 may be constituted by, for example, at least one compressed hydrogen cylinder. The sub-storage system 120 may include a fuel cell that generates electric power using the stored compressed hydrogen. The sub-storage system 120 may further include, for example, a hydrogen compression device that compresses hydrogen, a dispenser that supplies hydrogen to the fuel cell, and the like. If compressed hydrogen is employed as a method of storing power in the sub-storage system 120, the main storage system 110 is preferably a larger-scale system than the sub-storage system 120. When compressed hydrogen is employed as a method of storing electric power in the sub-storage system 120, the main storage system 110 may employ any of a hydrogen storage alloy, methylcyclohexane, ammonia, and liquefied hydrogen as a hydrogen carrier.

Additional Remarks

With regard to the embodiments described above, the following additional notes are further disclosed.

Appendix 1

The power storage system described in Appendix 1 includes a main storage system configured to navigate a water surface and provided in a power generation floating body that generates electric power using renewable energy, wherein electric power obtained by the electric power generation is irreversibly stored in the power generation floating body, and a sub-storage system in which electric power obtained by the electric power generation is reversibly stored in the power generation floating body.

According to the power storage system described in Appendix 1, two types of storage systems, a main storage system and a sub-storage system, are provided in the power generation floating body. The two types of storage systems have different storage states of generated electric power. The storage state of the electric power in the main storage system is irreversible with respect to the power generation floating body. Therefore, it is suitable for storing electric power that is not used in the power generation floating body. On the other hand, the storage state of the electric power in the sub-storage system is reversible with respect to the power generation floating body. Therefore, it is suitable for storing electric power used in a power generation floating body. In this way, the power storage system described in Appendix 1 can store power in a storage state according to the application.

Appendix 2

The power storage system according to Appendix 1, wherein in the power storage system described in Appendix 2, the power storage allowable amount of the main storage system is larger than the power storage allowable amount of the sub-storage system.

According to the power storage system described in Appendix 2, a larger amount of power than the sub-storage system can be stored in the main storage system. Therefore, it is possible to supply a larger amount of electric power to an external demand area. Further, the sub-storage system can be made more compact than the main storage system.

Appendix 3

The power storage system according to Appendix 1 or 2, wherein the power storage system described in Appendix 3 further comprises a power adjustment unit configured to adjust a distribution between an amount of electric power stored in the sub-storage system and an amount of electric power stored in the main storage system with respect to electric power obtained by the electric power generation.

According to the power storage system described in Appendix 3, the distribution of the amount of electric power between the main storage and the sub storage can be adjusted not uniformly but based on various situations and various conditions.

Additional Remark 4

In the power storage system described in Appendix 4, the power adjustment unit predicts an projected power demand amount to be used for the self-operation. The power storage system according to Appendix 3, wherein the distribution is adjusted so that the power amount of the sub-storage system ensures the projected power amount.

According to the power storage system described in Appendix 4, an projected power demand amount corresponding to an operation state (for example, a navigation state, a power generation state, and the like) of the power generation floating body is predicted and secured. Therefore, it is possible to adjust the power distribution between the main storage system and the sub-storage system so as not to interfere with the operation of the own base.

Appendix 5

The power storage system described in Appendix 5 includes a hydrogen carrier generating unit that generates a hydrogen carrier from electricity obtained from the power generation, and in the main storage system, the power is stored as the hydrogen carrier. The power storage system of any one of claims 1 to 4, wherein the power is stored in a storage battery in the sub-storage system.

According to the power storage system described in Appendix 5, power is stored as a hydrogen carrier in the main storage system. Hydrogen based on the stored hydrogen carrier is used as electric power, for example, at a demand site via a fuel cell. Thus, the power storage system described in Appendix 5 can contribute to the realization of a decarbonized society.

The present disclosure can be modified as appropriate within the scope and spirit of the disclosure that can be read from the claims and the specification as a whole, and a power storage system accompanied by such a modification is also included in the technical idea of the present disclosure.

What is claimed is:

1. A power storage system provided in a power generation floating body that is configured to navigate a water surface and that performs power generation using renewable energy, the power storage system comprising:
   a main storage system in which power obtained by the power generation is irreversibly stored with respect to the power generation floating body;
   a sub-storage system in which power obtained by the power generation is stored reversibly with respect to the power generation floating body; and
   a power adjustment unit configured to adjust distribution between a power amount stored in the sub-storage system and a power amount stored in the main storage system, with respect to the power obtained by the power generation.

2. The power storage system according to claim 1, wherein storage capacity of the main storage system is larger than storage capacity of the sub-storage system.

3. The power storage system according to claim 1, wherein the power adjustment unit predicts a projected power demand amount to be used for self-operation, and adjusts the distribution such that the power amount of the sub-storage system secures the power amount that is projected.

4. The power storage system according to claim 1, further comprising a hydrogen carrier generating unit for generating a hydrogen carrier from electricity obtained from the power generation, wherein:
   in the main storage system, the power is stored as the hydrogen carrier; and
   in the sub-storage system, the power is stored in a storage battery.

* * * * *